United States Patent
Green

(10) Patent No.: US 7,637,426 B1
(45) Date of Patent: Dec. 29, 2009

(54) METHOD AND SYSTEM FOR FINDING AN ALTERNATIVE GROUPING OF SELECTED ITEMS

(75) Inventor: Matthew K Green, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 763 days.

(21) Appl. No.: 11/231,235

(22) Filed: Sep. 20, 2005

(51) Int. Cl.
 *G06K 15/00* (2006.01)
(52) U.S. Cl. .............................. 235/383; 705/1; 705/26; 705/80
(58) Field of Classification Search ................. 235/383; 705/1, 26, 80
 See application file for complete search history.

(56) References Cited

U.S. PATENT DOCUMENTS

2002/0013774 A1* 1/2002 Morimoto .................... 705/80
2002/0111873 A1 8/2002 Ehrlich et al.
2002/0178014 A1* 11/2002 Alexander ..................... 705/1
2004/0172371 A1 9/2004 Mitsuoka et al.
2004/0249723 A1 12/2004 Mayer

* cited by examiner

*Primary Examiner*—Allyson N Trail
(74) *Attorney, Agent, or Firm*—Thomas, Kayden, Horstemeyer & Risley, LLP

(57) ABSTRACT

A method and system are provided for finding items for grouping items according to sorting characteristics. For example, a price comparison engine is described that obtains the original total purchase price for all items placed in the customer's shopping cart and compares the original total purchase price to further generated total purchase price options to determine if any cost savings can be achieved. Those further total purchase price options are generated by computing the total purchase price resulting from each possible combination of sellers and items in the shopping cart. In some embodiments, heuristics may be used by the price engine to reduce the number of seller combinations and purchase price options generated, limit the price variations upon which the total purchase price options are computed, and/or filter or sort the purchase price options to be displayed.

64 Claims, 9 Drawing Sheets

| ORIGINAL ORDER | OPTION A | OPTION B | OPTION C |
|---|---|---|---|
| Item #1: $310.00<br>From: Store A<br>Rating: ★☆☆☆☆ | Item #1: $343.00<br>From: Store B<br>Rating: ★★★★☆ | Item #1: $344.00<br>From: Store C<br>Rating: ★★★★★ | Item #1: $310.00<br>From: Store A<br>Rating: ★☆☆☆☆ |
| Item #2: $41.00<br>From: Store B<br>Rating: ★★★★☆ | Item #2: $41.00<br>From: Store B<br>Rating: ★★★★☆ | Item #2: $43.00<br>From: Store C<br>Rating: ★★★★★ | Item #2: $43.00<br>From: Store C<br>Rating: ★★★★★ |
| Item #3: $242.00<br>From: Store C<br>Rating: ★★★★★ | Item #3: $255.00<br>From: Store B<br>Rating: ★★★★☆ | Item #3: $242.00<br>From: Store C<br>Rating: ★★★★★ | Item #3: $242.00<br>From: Store C<br>Rating: ★★★★★ |
| Shipping & Handling: $55.00 | Shipping & Handling: $52.00 | Shipping & Handling: $0.00 | Shipping & Handling: $31.00 |
| Taxes: $46.72 | Taxes: $0.00 | Taxes: $50.32 | Taxes: $50.08 |
| Total: $694.72 | Total: $691.00 | Total: $679.32 | Total: $676.08 |
| GET COST BREAKDOWN | Dollar Savings: $3.72<br>Percentage Savings: 0.5% | Dollar Savings: $15.40<br>Percentage Savings: 2.2% | Dollar Savings: $18.64<br>Percentage Savings: 2.7% |
| PLACE ORDER | | | Sort By<br>Shipping ▼ |
| ACCEPT ☐ | ACCEPT ☐ | ACCEPT ☑ | ACCEPT ☐ |

*Fig. 4.*

METHOD AND SYSTEM FOR FINDING AN ALTERNATIVE GROUPING OF SELECTED ITEMS

FIELD OF THE INVENTION

The present invention relates to grouping goods and services from sellers, and more specifically relates to a method and system for grouping goods and services from a combination of sellers based upon sorting characteristics.

BACKGROUND OF THE INVENTION

Electronic commerce is an increasingly popular way of conducting business. Customers are able to identify and purchase a wide variety of goods and services over computer networks, including the Internet. The same goods and services can be offered by multiple sellers, each with its own taxes, shipping charges promotions, conditions, and/or quality. The price the customer eventually pays for goods and services he or she has selected for purchase is a complicated calculation of price, price promotions, rebates, shipping, shipping promotions, taxes, etc. For example, the total purchase price may be dependent on the number of items purchased (e.g., buy three, get one free) or the other items being purchased by the customer (e.g., buy item X and get item Y for free). As yet other examples, the total purchase price can be dependent on the grouping of items purchased (e.g., consolidated shipping for multiple items may be less expensive) or the total cost of the items to be purchased (e.g., free shipping if the total cost of the items reaches a certain threshold).

This price structure leads to a situation where a customer will think he is getting the best deal possible by placing the least expensive items in his shopping cart for purchase. However, at purchase the customer may be surprised by the total purchase price including shipping charges and taxes and, thus, might find that the total purchase price could be less expensive from a different combination of sellers. Unfortunately for consumers, finding the optimal combination of sellers that will result in the least expensive total purchase price is difficult and time-consuming. The present invention is directed to a computer-implemented method and system for grouping items using different combinations of sellers based upon sorting characteristics, such as total price. For purposes of the present description, the term "seller" may include any type of merchant, gender, supplier, or store, whether retail, wholesale, "second-hand," used, etc.

SUMMARY OF THE INVENTION

To address the above-described shortcomings in the art, a computer-implemented method, system and computer-accessible medium are provided that group a selection of items based upon sorting characteristics. Typically two or more items form a "group", although theoretically, the present invention may be applied to a group having only one item. Additionally, the grouping can be based on any number of characteristics or combination of characteristics.

In an illustrative embodiment, the grouping of items may be based upon lowest purchase price to a customer. The lower purchase price options are found using a combination of sellers or items that is different than the combination of sellers or items used by the customer. The purchase price options are displayed if said purchase price options result in an acceptable cost savings as compared to the initial purchase price found by the customer. The cost savings may be deemed acceptable if the cost savings are greater than a minimum threshold. The customer is then enabled to order the selected group of items from the combination of sellers from which the lower purchase price options are determined by placing an order with the electronic marketplace. In one embodiment, the lower purchase price options are generated following a customer request to determine such purchase price options. Additionally, in another embodiment, the customer order for the selected group of items may be automatically generated.

The purchase price options may be determined by identifying possible sellers of each item in the group and for each combination of the possible sellers and items in the group, computing a purchase price for the group of items, and comparing the purchase price to the initial purchase price. If the purchase price is lower than the initial purchase price, the combination of sellers and the computed purchase price are identified as a purchase price option.

In yet other embodiments, heuristics may be used to limit the number of possible sellers identified and thus, decrease computation time. Heuristics may also be used in processing the selection criteria. For example, in an embodiment in which the selection criteria relate to total purchase price, heuristics may be used to limit the price variations upon which the purchase price options are computed as a function. In addition heuristics may be used to determine which purchase price options to display. Heuristics may vary and may be based, for example, on a price promotion, a shipping promotion, a seller trust rating, availability of equivalent items, a condition of the items, etc.

In still other embodiments, where computation time is a concern, generation of purchase price options is not exhaustive. Rather, the purchase price options are generated until a maximum time limit is reached, until a bias has been satisfied, or until at least one of a maximum number and a maximum percentage of options is reached. In yet other embodiments, purchase price options are generated only while a response is generated to a request for a Web page.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 depicts an exemplary Web page displaying less expensive purchase options for the items selected by the customer as shown in FIG. 3;

DETAILED DESCRIPTION

Computer networks are well known in the field of communications. Computer networks may include communication links that extend over a local area or a wide area, or even be global, as in the case of computer networks forming the Internet. The present invention is described herein as using the Internet. Persons of ordinary skill in the art will recognize that the invention may also be used in other interactive environments that include local or wide area networks that connect merchants and customers for electronic commerce.

Prior to discussing the details of the invention, it should be understood that the following description is presented largely in terms of steps and operations that may be performed by conventional computer components. These computer components, which may be grouped in a single location or distributed over a wide area, generally include computer processors, memory storage devices, display devices, input devices, etc. In circumstances where the computed components are distributed, the computer components are accessible to each other via communication links.

Figure 1:
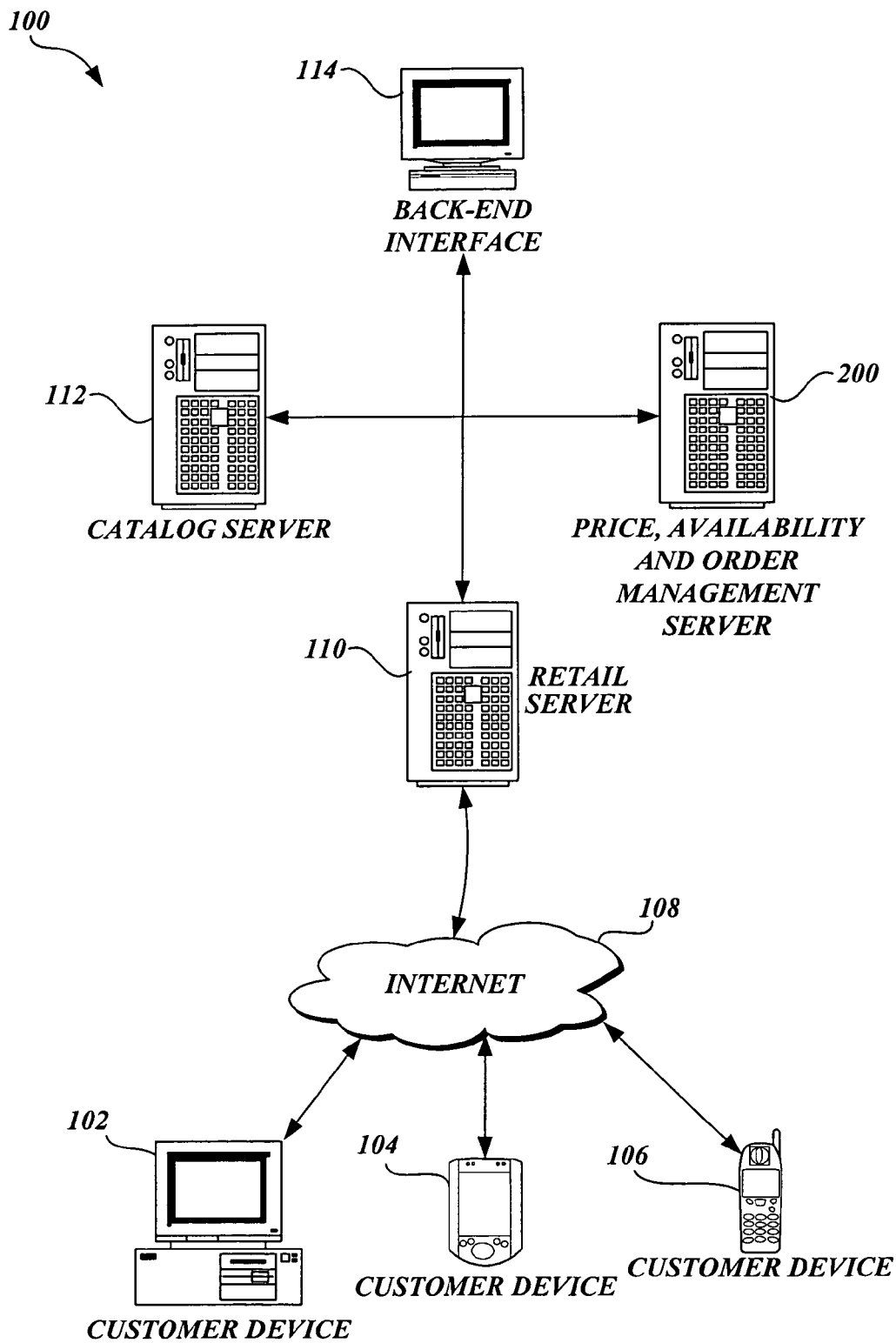
FIG. 1 is a pictorial diagram showing an exemplary operating environment for implementing a method and system that finds a lower total purchase price for a group of items.

FIG. 1 is a pictorial diagram of an exemplary operating environment for implementing embodiments of the present invention. The environment shown in FIG. 1 includes an electronic marketplace system 100 with a price, availability and order management server 200 that determines lower purchase price options or alternatives for goods and services selected for purchase by a customer. The environment also includes retail and catalog servers 110, 112 that facilitate online browsing and purchasing of goods and services using various customer devices, such as a computer system 102, a PDA 104, and a wireless telephone 106. Although the present invention will be described in detail with regard to an electronic marketplace system 100 that utilizes total purchase price as selection criteria, one skilled in the art will appreciate that the present invention may be utilized in regard to various selection criteria and/or combination of selection criteria.

Those skilled in the art will recognize that the customer devices illustrated in FIG. 1 may be any of a number of computing devices that are capable of communicating over a network including, but not limited to, set-top boxes, personal digital assistants, cellular telephones, music players, web pads, tablets, laptop computers, desktop computers, etc. Each of the servers 110, 112 and 200, which will be described below in more detail, may be connected to a back-end interface 114 for sellers that provides for order fulfillment. Each of the customer devices 102, 104, 106 is configured for communication with the marketplace system 100. In the environment shown in FIG. 1, the customer devices 102, 104, 106 communicate with the marketplace system 100 via the Internet, as depicted by a cloud 108. Protocols and components for communicating via the Internet are well known to those skilled in the art of computer communications and, thus, need not be described in more detail herein.

The marketplace system 100 is depicted in FIG. 1 as operating in a distributed computer environment comprising several computer systems that are interconnected using one or more computer networks. However, it will be appreciated by those skilled in the art that the system 100 could equally operate within a computer system having a fewer or greater number of components than are illustrated in FIG. 1. Thus, the depiction of marketplace system 100 in FIG. 1 should be taken as exemplary and not limiting to the present invention. For example, the system 100 could implement various Web services components and peer-to-peer network configurations to implement at least a portion of the processes.

In brief, the retail server 110 is generally responsible for providing front-end marketplace communication with various customer devices, such as devices 102, 104, 106, via the Internet. The front-end communication provided by the retail server 110 may include generating text and/or graphics, possibly organized as a Web page or other user interface using hypertext transfer or other protocols in response to information inquiries received from the various customer devices. Non-limiting examples of such Web pages are shown in FIGS. 3A, 3B, 4, 5 and 8.

The retail server 110 may obtain information on available goods and services (generically and interchangeably referred to herein as "items") directly from the catalog server 112, as is done in conventional electronic commerce systems. In one embodiment of the present invention, the catalog server 112 includes information on items available from a plurality of sellers (as opposed to storing information for only a single seller). Accordingly, the retail server 110 may obtain item information for items offered for sale by a plurality of sellers and make such item information available to a customer at a single Web site. A customer may then purchase items from a plurality of sellers in a single transaction or order placed with the marketplace system. This eliminates the need for the customer to visit or search multiple Web sites (e.g., one for each seller) and place multiple orders (e.g., one for each seller).

The retail server 110 may also obtain various information, such as pricing information, on items offered for sale by multiple sellers from the price, availability, and order management server 200 (hereinafter, the "order management server") to present to customers in accordance with the present invention. The order management server 200 may communicate with the catalog server 112 to obtain information to be used in evaluating selection criteria, such as total purchase price, for items selected by a customer for purchase. As will be described in more detail below, the order management server 200 obtains the necessary information from the catalog server 112, generates the pricing information and provides the pricing information to the retail server 110.

The catalog server 112, for its part, is generally responsible for maintaining a comprehensive catalog of items that are available to the customer via the electronic marketplace system 100. This catalog may be maintained in a conventional database stored in one or more memory storage devices within the catalog server 112. In other embodiments of the present invention, the catalog server 112 may be in communication with other servers and databases also storing catalog information for items available via the electronic marketplace. For example, such servers and databases may be operated by different sellers and, thus, may include various catalog information for items offered for sale by those sellers.

Figure 2:
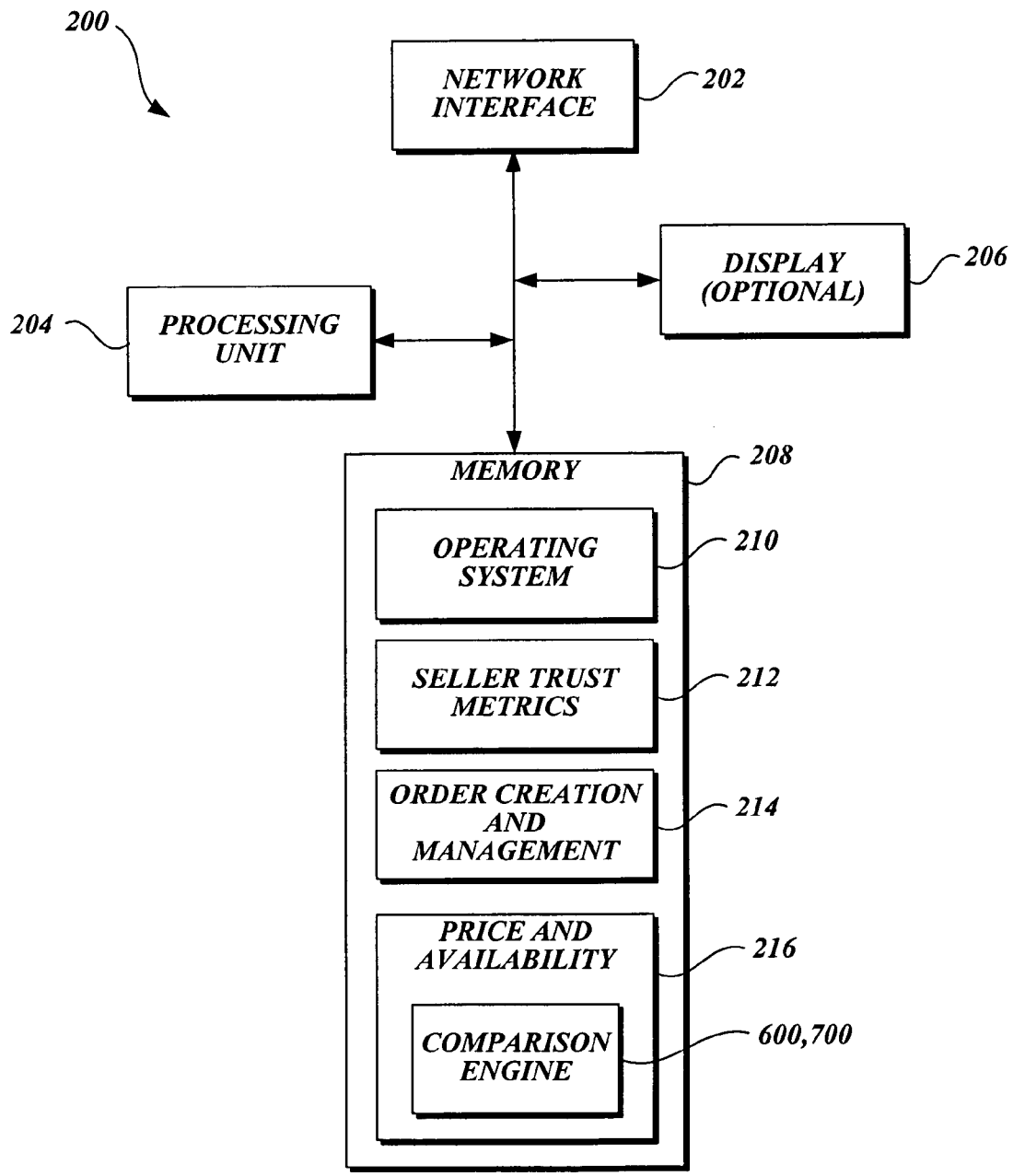
FIG. 2 is a block diagram depicting an arrangement of certain computer hardware and software components of a price, availability and order management server shown in FIG. 1.

In the marketplace system 100 shown in FIG. 1, in an illustrative embodiment, the order management server 200 is generally charged with the task of computing the total purchase price for items selected by a customer for purchase (e.g., the items a customer has placed in his or her shopping cart) and for determining lower purchase price options for the same or similar items from different combinations of sellers. FIG. 2 is a block diagram that depicts an arrangement of computer hardware and software components that may be used to implement the order management server 200. In FIG. 2, the order management server 200 includes a processing unit 204, a memory unit 208, an optional display 206, and a network interface 202, all of which communicate with one another by way of a communication bus. A similar arrangement may be provided by the retail server 110 and catalog server 112. The network interface 202 is preferably connected to one or more computer networks that connect to other components in the marketplace system 100. The processing unit 204 may thus receive information and instructions in other computing components, such as the retail server 110 and the catalog server 112, via the network interface 202. The processing unit 204 may also communicate information to and from the memory 208, and further provide output information for the display 206. Other components not shown, such as a user input device, may be included in the order management server 200.

The memory 208 contains computer program instructions that the processing unit 204 executes in order to operate the order management server 200. Similarly, a memory in the retail server 110 contains computer program instructions that are executed by a processing unit in order to operate the retail server 110. In the embodiment shown in FIG. 2, the memory 208 includes, for example, an operating system 210 that provides computer program instructions for use by the processing unit 204 in the general administration and operation of the program server 200. The memory 208 further includes computer program instructions and other information for implementing features of the invention. For example, in one embodiment, memory 208 includes metrics 212 of seller trust ratings and other relevant information for each seller that offers goods and/or services via the electronic marketplace 100. The memory 208 may also include order creation and management processes 214 that govern the creation of an order for one or more items for purchase, placement of the order, and fulfillment of the order. The order creation and management processes 214 may work in conjunction with price and availability processes 216 that determine the appropriate price and availability for each item identified in an order. In one embodiment of the present invention, the price and availability processes 216 include a price comparison engine, such as price comparison engine 600, 700, the operation of which will be described in greater detail below, particularly in reference to FIGS. 6 and 7. In alternative embodiments involving alternative or additional selection criteria, the memory 208 may also utilize additional processes to evaluate the alternative or additional selection criteria.

As noted above, the present invention locates lower total purchase price options for items a customer has selected for purchase. In one embodiment of the present invention, a customer may purchase items from a plurality of sellers, via a single transaction or order placed with the marketplace system 100. In such embodiments, the shopping server 110 may produce an order summary page such as the order summary page 300 depicted in FIG. 3A. In the exemplary order summary page 300, the items the customer has placed in his or her shopping cart, i.e., the items the customer has selected for purchase, are identified in a box 302. The shipping address and billing address supplied by the customer are displayed at 304 and 308, respectively. The shipping method selected by the customer is displayed at 305 and in the illustrated embodiment, the customer has selected standard shipping as the shipping method to apply to this particular order. However, it will be appreciated that the customer previously selected this shipping method from a plurality of shipping options, including, for example, standard shipping, two-day shipping, one-day shipping, etc.

The payment method selected by the customer is displayed at 306, and in the illustrated embodiment, the payment method selected by the customer is a VISA® credit card. It will be appreciated that the customer previously entered his or her credit card information, including credit card number, expiration date, etc. At 310, the customer is prompted to enter a gift certificate or promotion code which, if entered, will result in a dollar amount being subtracted from the total purchase price. At 312, a summary of the order is displayed reflecting the aggregate price of the items selected, the shipping and handling costs for the items selected, a subtotal of the aggregate price and the shipping and handling costs, the sales tax applied to the subtotal, and a total purchase price. In the illustrated embodiment, the customer has the option of placing the order as summarized by selecting a "place order" button 314 or finding less expensive purchase price options by selecting a "find it cheaper" button 316.

In the illustrated embodiment, the find it cheaper button 316 is displayed on the order summary page 300 after the customer has selected items for purchase, and entered the appropriate shipping, payment, billing and promotional information. In other words, the find it cheaper button is presented at the end of the purchase pipeline after the customer has completed shopping and immediately before placing the order. At this juncture, the order management server 200 may be provided with all of the relevant information necessary to calculate different purchase price options, since such purchase price options may be dependent upon the items selected, shipping type, shipping address, payment instrument type, promotions, etc. However, in other embodiments of the invention, the find it cheaper function may be presented to the customer or enabled earlier in the purchase pipeline, e.g., after the customer has selected the items for purchase, but before entering the payment method. In yet other embodiments, the find it cheaper option may be selected as a standard setting for the customer. Accordingly, the order management server 200 will automatically generate less expensive purchase price options and display those purchase options to the customer prior to placing the customer's order without requiring further instruction from the customer to do so or requiring display of a find it cheaper button or other user interface prompting mechanism. In yet other embodiments, the find it cheaper button may only be displayed if less expensive purchase price options are available in the first place.

Figure 3A:
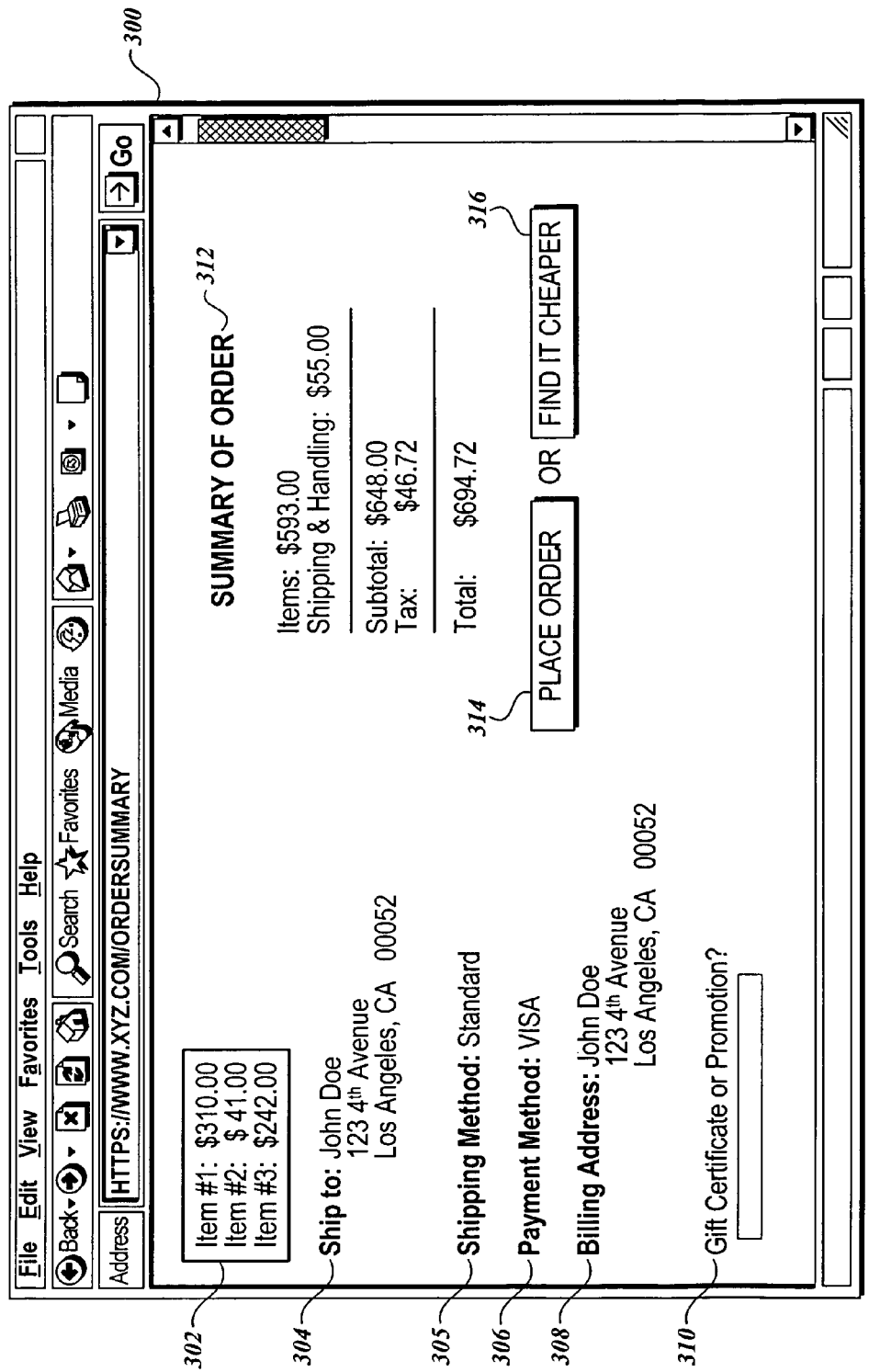
FIG. 3A depicts an exemplary Web page presenting a summary of a customer's order for a group of items and providing selection criteria based on total purchase price.
Figure 3B:
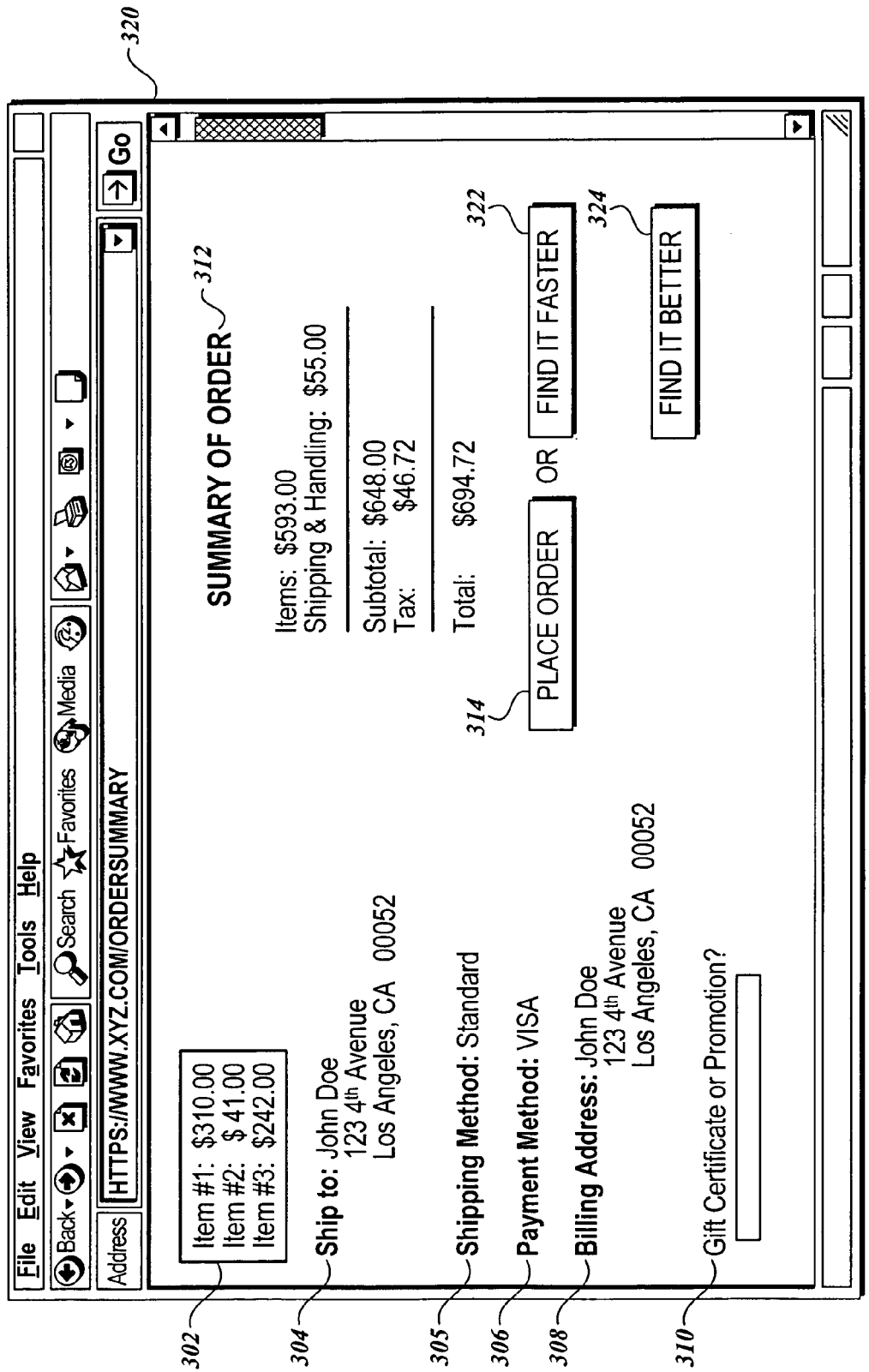
FIG. 3B depicts an exemplary Web page presenting a summary of a customer's order for a group of items and providing selection criteria based on fastest shipping time.

With reference now to FIG. 3B, in an alternate embodiment, the shopping server 110 may produce an order summary page 320, which provides a customer with alternative grouping criteria. The order summary page 320 is similar to order summary page 300 with information/controls 302, 304, 305, 306, 308, 310, 312, and 314. However, in order summary page 320, the customer is presented with a "find it faster" button 322 that corresponds to selection criteria based upon shipping time to the address identified by the customer at 304. Additionally, the order summary page 320 also includes a "find it better" button 324 that corresponds to selection criteria based upon quality of the selected items.

Referring again to FIG. 3A, if the find it cheaper button 316 is selected by the customer, a Web page such as find it cheaper Web page 400 depicted in FIG. 4 may be displayed to the customer. In one embodiment, the find it cheaper page 400 displays the customer's original order 402 as well as each of the less expensive purchase price options generated by the order management server 200. In the illustrated example, the order management server 200 has generated three less expensive total purchase price options, i.e., Option A 404, Option B 406, and Option C 408. As indicated in the customer's original order 402, the customer placed in her shopping cart three different items (i.e., Items 1, 2, and 3), each from a different seller (i.e., Stores A, B, and C). The customer anticipated generating the lowest total purchase price with the belief that she had selected the items having the lowest purchase prices available from the sellers offering them. However, due to variations in shipping costs (which may vary based on distance, number of items shipped, aggregate price of order, etc.), taxes, type of payment instrument, use of gift certificate, sales promotion (e.g., buy X, get Y free), condition of the items (e.g., new, refurbished or used), brand (e.g., branded v. generic), etc., the same or equivalent items could be purchased from a different combination of sellers at a lower total purchase price.

In the illustrated example, variations in shipping costs and taxes result in lower total purchase prices using combinations of sellers other than those selected by the customer. More specifically, in the original order 402, the customer selected Item 1 at a purchase price of $310.00 from Store A, Item 2 at a price of $41.00 from Store B, and Item 3 at a price of $242.00 from Store C. With shipping and handling, and taxes, the total purchase price for Items 1, 2 and 3 is $694.72. However, as can be seen in Option A 404, a lower total purchase price can be achieved using a different combination of sellers, even though some of the items are more expensive. For example, under Option A 404, the same Item 1 may be purchased from a different seller, i.e., Store B, at a more expensive price, i.e., $343.00. Item 2 can be purchased from the same seller as the original order at the same price, i.e., $41.00 from Store B. Item 3, on the other hand, can also be purchased from Store B, but at a more expensive price (i.e., $255.00), than in the original order. However, by purchasing all items from a single seller, Store B, the shipping and handling charges are reduced and the taxes are eliminated, resulting in an overall lower total purchase price than the original order (i.e., $691.00 versus $694.72).

In the illustrated embodiment, the total dollar savings between Option A and the original order is displayed as $3.72. In addition, the percentage savings between Option A and the original order is displayed as well at 0.5%. Purchase price Options B 406 and C 408 are similarly displayed. Accordingly, the customer may review each of the total purchase price options generated by the order management server 200 and select the most desirable purchase price option by selecting one of the acceptance boxes 412, 414, 416, or 418. In the illustrated embodiment, the customer has selected acceptance box 416 associated with purchase Option B. In an alternative embodiment, the Web page 400 can be configured to automatically select an option for purchase based upon customer criteria. For example, the Web page may be configured to automatically select an option based upon a threshold cost savings or a preferred vendor.

Although purchase Option B does not result in the greatest dollar or percentage savings, the customer has selected the purchase option because the seller from whom the items are being purchased has a five star rating. In contrast, purchase Option C 408, although less expensive, includes an item from a seller with only a one star rating. In the illustrated embodiment, the trust ratings for each seller are displayed and the customer is given the discretion to select the desired purchase price option with knowledge of the seller trust ratings. As shown in FIG. 4, the customer has chosen a slightly more expensive purchase item in exchange for the comfort level in purchasing the item from a higher quality seller. However, in other embodiments of the present invention, and as described in more detail below, a minimum seller trust rating may be set by customer or set by the system. Accordingly, only those sellers meeting the minimum seller trust rating are considered and the resulting purchase price options displayed. In an illustrative embodiment, the Web page 400 can include additional selections, such as pull down 422, that allows the customer to select additional filter criteria to sort the grouping of items. For example, pull down 422 can allow a customer to sort by shipping time or seller quality ratings.

Figure 5:
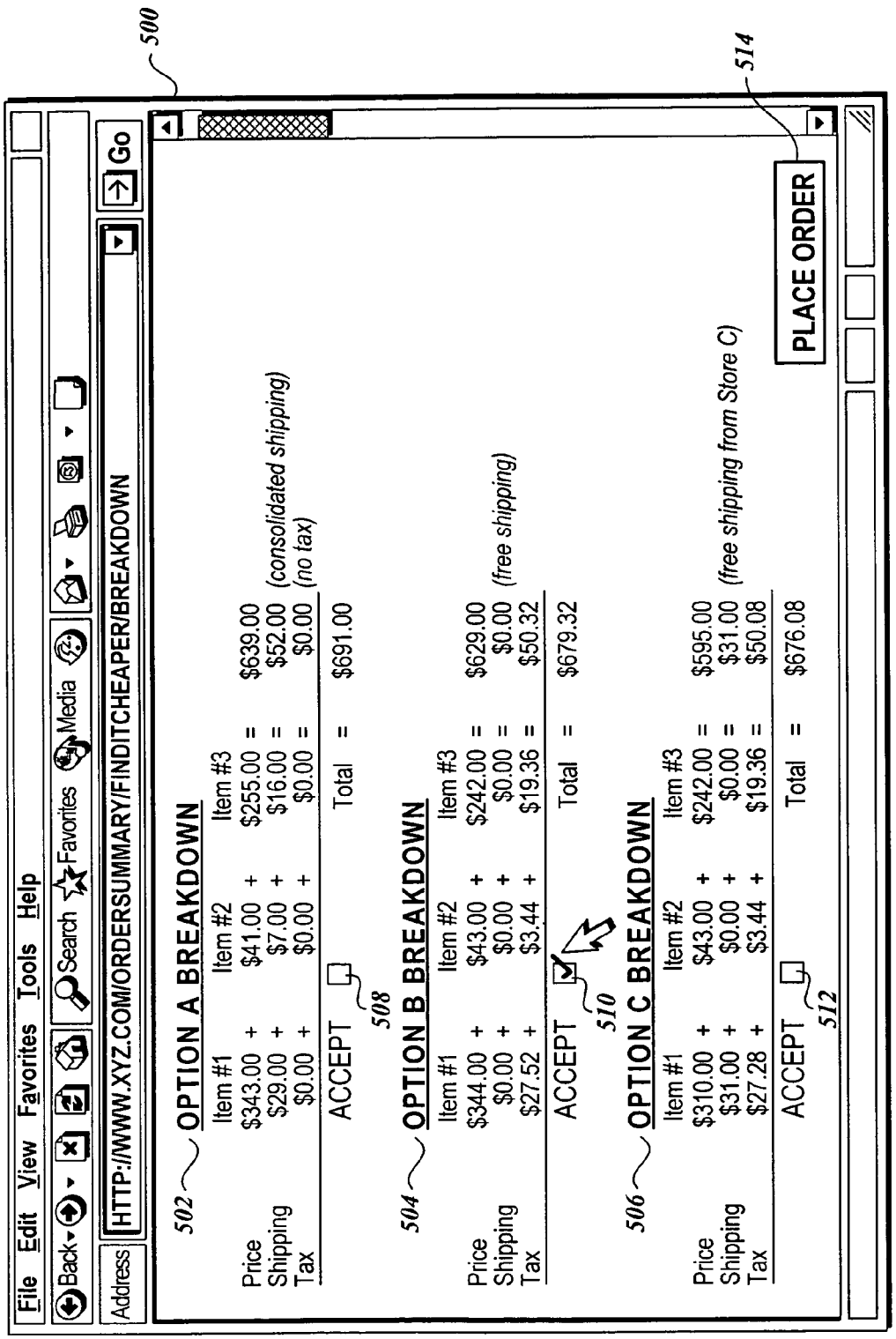
FIG. 5 depicts an exemplary Web page displaying a breakdown for each of the less expensive purchase options shown in FIG. 4.

Prior to continuing with placement of the order, the customer can request a cost breakdown of each of the purchase price options in order to better understand where the savings were obtained. For example, in one embodiment of the invention, the customer can click on a "Get Cost Breakdown" button 410 that causes a breakdown page, such as exemplary breakdown page 500, to be displayed on the customer's device, as shown in FIG. 5. Accordingly, when the total purchase price of Option A is broken down as displayed, it becomes apparent that the cost savings were realized, in large part, due to the elimination of taxes when placing the order with Store B. Some additional cost savings were also achieved by consolidating shipping from one seller. However, a good portion of the cost savings were offset by the individual purchase prices of each item.

As shown in the Option B cost breakdown 504, the cost savings were achieved by a free shipping promotion offered by Store C. Finally, as shown in the Option C cost breakdown 506, a portion of the cost savings was realized by a free shipping promotion offered from Store C, while the remaining portion of the cost savings was realized from lower individual purchase prices for Items 1 and 3. Those skilled in the art will appreciate that the breakdown page 500 is an optional display. Accordingly, in other embodiments of the present invention, a cost breakdown may not be displayed to the customer at all, or if displayed, can be displayed with less, more, or different detail than that shown in FIG. 5. Once the customer has decided which purchase price option to select, by selecting the appropriate acceptance box 508, 510, or 512 associated with Option A, Option B, or Option C, respectively, the customer may complete the order process by selecting a place order button 514. The order will then be placed and fulfilled in accordance with the order creation and management processes 214, as is known in the art.

Figure 6:
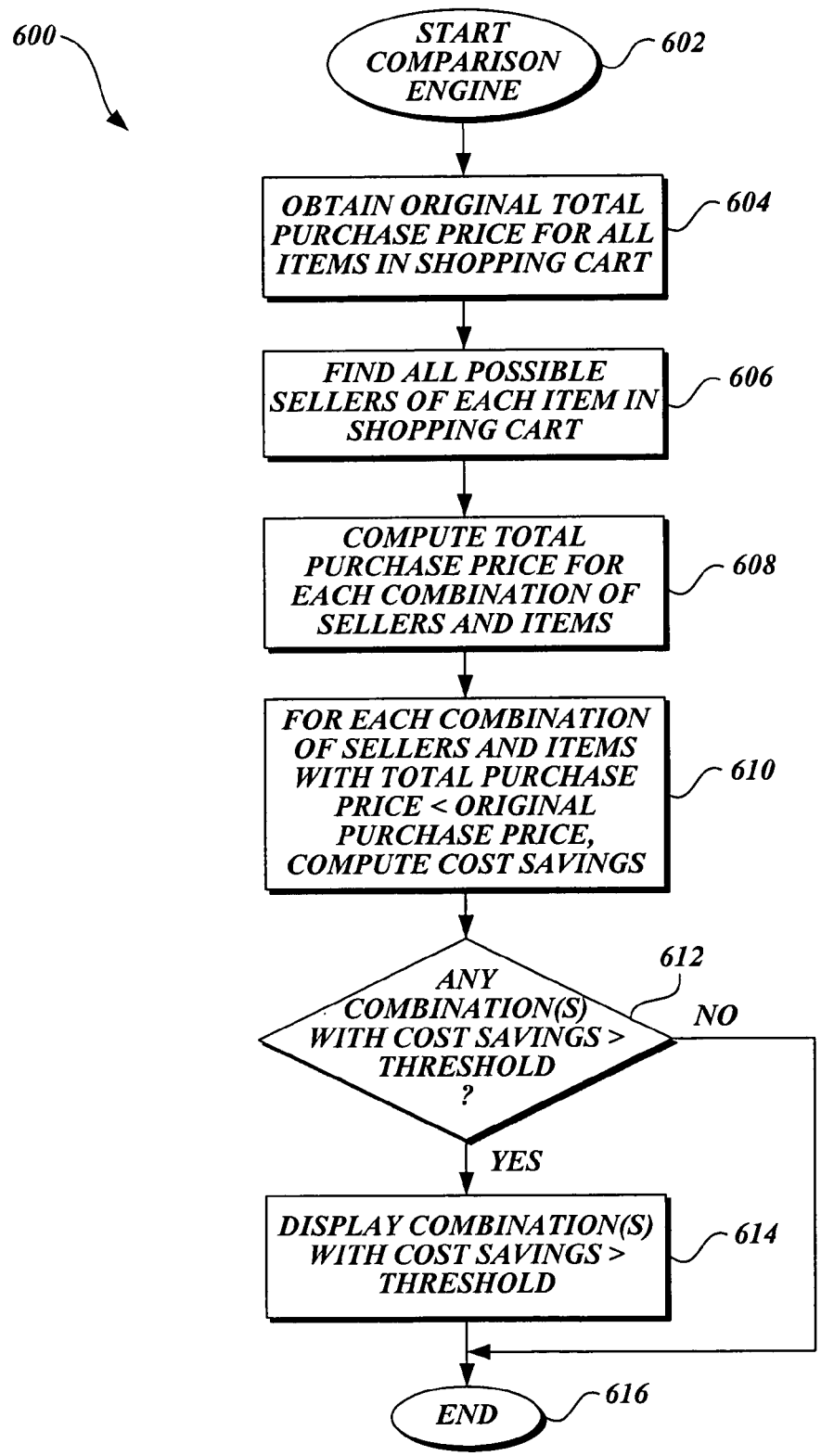
FIG. 6 is a flow diagram of an exemplary embodiment of a price comparison engine implemented by the price, availability, and order management server depicted in FIG. 2 for determining less expensive purchase options using different combinations of sellers.

Now that one embodiment for displaying less expensive total price options has been described, embodiments of processes for generating such purchase price options will be described in more detail. One embodiment of such a price comparison engine is shown in FIG. 6. As noted above, in one embodiment of the present invention, the price comparison engine may be triggered when a customer selects a find it cheaper button 316, as shown in FIG. 3. In yet other embodiments, the price comparison engine 600 may be triggered automatically prior to placing the order. Upon such instruction, the price comparison engine 600 begins in a block 602 and proceeds to a block 604. In block 604, the price comparison engine 600 obtains the original total purchase price for all items placed in the customer's shopping cart (e.g., the original total purchase price generated by the order management server and displayed in Web page 300 in the summary of the order 312). As will be described in more detail below, the original total purchase price is compared to further generated total purchase price options to determine if any cost savings can be achieved. Those further total purchase price options are generated in the embodiment of the invention depicted in FIG. 6 using a brute force approach, i.e., computing the total purchase price resulting from each possible combination of sellers and items in the shopping cart and comparing each such computed total purchase price to the original total purchase price.

Referring specifically to FIG. 6, the price comparison engine 600 finds all possible sellers of each item in the customer's shopping cart in a block 606. Next, in a block 608, the price comparison engine 600 computes the total purchase price for the items identified in the customer's shopping cart for each combination of possible sellers and items found in the shopping cart. The total purchase price is typically computed as a function of the aggregate purchase price of all of the items selected, and at least one other price variation, e.g., shipping costs, sales tax, sales promotions, type of payment instrument, gift certificates, item condition, brand, etc. Once the total purchase price has been computed for the same or equivalent items for each combination of sellers and items, those purchase prices are compared to the original purchase price, and for each combination of sellers and items that results in a total purchase price less than the original purchase price, the price comparison engine 600 computes the cost savings in a block 610. It will be appreciated by those skilled in the art that the cost savings may be computed as an absolute dollar amount and/or a percentage amount.

Once the cost savings are computed, the price comparison engine determines in a decision block 612 if any combinations of sellers results in a total purchase price with cost savings greater than a minimum threshold. For example, in one embodiment of the present invention, only those purchase price options resulting from combinations of sellers with cost savings greater than $5.00 or greater than 5% are further considered. If no such purchase price options have been found, then the price comparison engine ends in a block 616. However, if there exist purchase price options with cost savings greater than the minimum threshold, those purchase price options are then displayed for the customer, e.g., in Web page 400, in a block 614. In other embodiments of the present invention, the minimum threshold may be set or default to zero. In such cases all of the purchase price options with any cost savings may be displayed for the customer. The price comparison engine 600 then ends in a block 616.

Using the brute force approach described above, the number of possible combinations of sellers and items to be computed will grow exponentially depending on the number of items in the shopping cart and the number of sellers selling those items. This relationship may be represented mathematically by the following equation:

$$\theta(m^n) \qquad \text{(Eq. 1)}$$

where n is the number of items in the shopping cart and m is the number of sellers selling the same items. Accordingly, if two sellers sell the same ten items found in the shopping cart, there will be over 1,000 seller/item combinations to be evaluated for cost savings. Those skilled in the art will appreciate that number of possible combinations to be generated and, thus, the computation time necessary for generating those combinations could increase exponentially as more items and/or sellers are considered. Therefore, the brute force approach employed by the price comparison engine 600 is better suited for a small number of items and a small number of sellers.

Using the example illustrated in FIGS. 3 and 4 in which there are a relatively small number of sellers and items, the price comparison engine 600 identifies Stores A, B, and C as all of the possible sellers of Items 1, 2, and 3 in the customer's shopping cart in accordance with block 606 of FIG. 6. Next, in accordance with block 608, the price engine computes the total purchase price for Items 1, 2, and 3 resulting from each combination of Stores A, B, and C and Items 1, 2, and 3. More specifically, for each combination of Store A, Store B, and Store C and Item 1, Item 2, and Item 3 (from each such Store A, Store B, and Store C), the price comparison engine 600 computes a total purchase price. Each such total purchase price is computed as a function of the aggregate prices at which the items are sold by the sellers in the given combination, the shipping costs for each of the items as charged by the sellers in the given combination, the sales promotions offered by each of the sellers in the given combination, etc. In the illustrated example, twenty-seven such combinations (i.e., $3^3$), and thus twenty-seven purchase price options are generated. Once the total purchase price has been completed for each combination of sellers and items, in the illustrated example in accordance with block 608, the price comparison engine 600 computes the cost savings for each combination with a total purchase price less than the original purchase price in accordance with block 610. Those purchase price options resulting from combinations of sellers with cost savings greater than a minimum threshold (i.e., Options A, B, and C) are then displayed in Web page 400. In the illustrated embodiment, the threshold is set to zero so that all purchase price options resulting in a cost savings are displayed to the customer. It will be appreciated, however, that in some embodiments a limit may be placed on the number of purchase price options that may be displayed.

Figure 7:
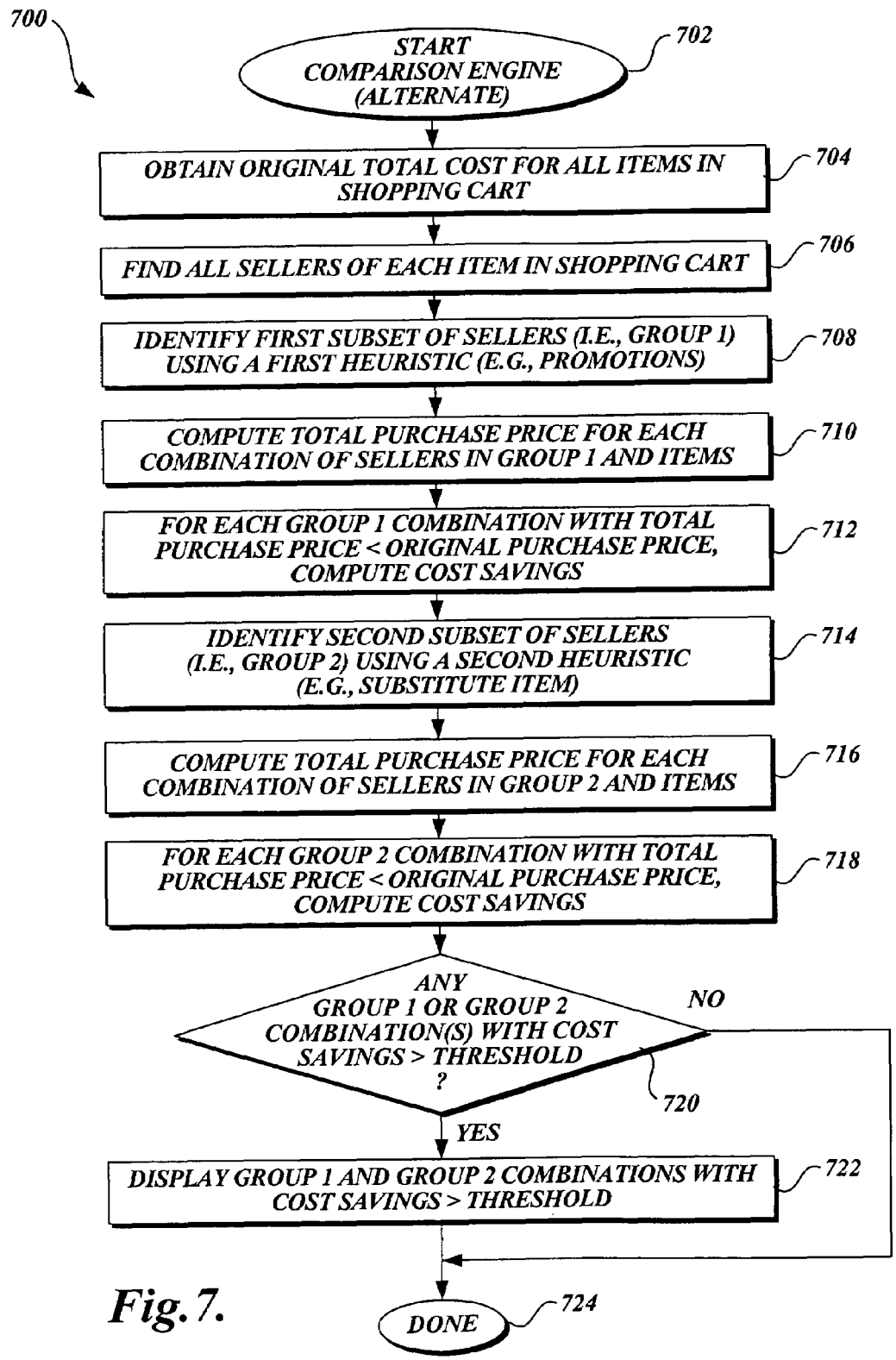
FIG. 7 is a flow diagram depicting an alternative embodiment for a price comparison engine for determining less expensive purchase options using different combinations of sellers.

In other embodiments of the present invention, where the number of sellers and/or items is larger, heuristics may be used to reduce the number of combinations and purchase price options generated and, thus, reduce computation time. One such alternative embodiment is depicted in FIG. 7 with reference to alternate price comparison engine 700. Price comparison engine 700 is similar to price comparison engine 600 except that it applies heuristics to limit the sellers considered to a specific group from whom more optimal results may be anticipated. Price comparison engine 700 begins in a block 702 and proceeds to a block 704 in which the price comparison engine 700 obtains the original total purchase price for all items placed in the customer's shopping cart. Next, in block 706, the price comparison engine 700 finds all possible sellers of each item in the customer's shopping cart. In order to reduce the number of possible combinations generated by the price comparison engine 700, a first, smaller subset of those sellers (i.e., "Group 1") is identified using a first heuristic. For example, those sellers offering a price promotion (e.g., buy item X, get Y free, two for the price of one, or other discounts, rebates, coupons, etc.) on the items in the shopping cart are identified. Those skilled in the art will appreciate that the price comparison engine 700 is more likely to obtain a lower total purchase price from those sellers offering such promotions. Accordingly, in one embodiment of the invention, only those sellers are considered by the alternate price comparison engine 700. Once Group 1 is identified, the price comparison engine 700 computes the total purchase price for each combination of sellers in Group 1 and items in a manner similar to that described above in connection with FIG. 6.

It will be appreciated that various other heuristics, e.g., heuristics based on seller trust rating, shipping, item condition, availability of substitute or equivalent products, etc., may be used in addition to or in lieu of a price promotions heuristic to reduce the number of sellers being considered and, thus, reduce computation time. In addition, heuristics may be used to limit other price variations upon which the total purchase price is computed, e.g., shipping, taxes, etc. Heuristics may also be used to filter or sort the purchase price options that are generated. For example, heuristics based on the class or rating of sellers may be used to further reduce the number of combinations to be generated. As noted above, seller ratings may be obtained from the seller trust metrics 212 stored in memory 208 of the order management server 200. Only those sellers having a minimum acceptable trust rating (e.g., two stars or higher) may then be considered by the price comparison engine 700. Alternatively, the price comparison engine may generate seller and item combinations without the rating heuristic and instead apply the rating heuristic to the resultant purchase price options to filter out those options including sellers with an unacceptable rating or sort the options according to the ratings heuristic. In the illustrated embodiment (e.g., FIG. 8 described below), the minimum seller trust rating is input by the customer. However, in other embodiments the minimum seller trust rating may be a system setting previously stored in memory 208 of the order management server 200.

Heuristics may also be based on shipping. The shipping heuristic may be used in computing the total purchase price for each combination of sellers and items so that only the shipping costs corresponding to a shipping option selected by the customer or set by the system are considered in the computation. Shipping may also be used to further limit the number of sellers from which purchase price combinations will be generated. For example, the price comparison engine 700 may consider only those sellers within a particular geographical distance from the customer (as shorter shipping distances may lead to lower shipping costs) and/or the price comparison engine 700 may consider only those sellers in geographic locations that do not require payment of sales taxes. Such geographic locations are identified in one embodiment of the present invention using the shipping address provided by the customer.

Referring again to FIG. 7, once the total purchase price has been computed for each combination of sellers in Group 1 and items, the total purchase price for each combination is compared to the original purchase price, and for each combination of sellers in Group 1 and items which results in a total purchase price less than the original purchase price, the price comparison engine 700 computes the cost savings in a block 712. As noted above, those cost savings may be computed as an absolute dollar amount and/or a percentage amount.

It will be appreciated that, in some embodiments of the present invention, the cost savings resulting from each combination of Group 1 sellers and items may simply be compared to a minimum cost savings threshold and those purchase price options with sufficient cost savings may be displayed to the customer for selection. However, in the embodiment illustrated in FIG. 7, further price comparisons are conducted in an effort to achieve more optimal purchase price options. More specifically, a different heuristic is used to generate a second set of purchase price options with different cost savings. The cost savings of the second set of purchase price options is then compared to the cost savings of the first set of purchase price options to identify the purchase price options resulting in the greatest cost savings. In other embodiments of the present invention, this process may be repeated using additional heuristics, with the intent of further optimizing the resultant purchase price options.

Specifically referring now to FIG. 7, after the cost savings resulting from each of the combinations of Group 1 seller and items is computed in block 712, a second subset of sellers (i.e., "Group 2") is identified using a second, different heuristic in a block 714. In one embodiment of the present invention, the second heuristic used to identify sellers may be a heuristic based on equivalent or substitute products. For example, those sellers offering a generic substitute of the items in the shopping cart are identified. Those skilled in the art will recognize that the price comparison engine is more likely to obtain a lower total purchase price from such sellers since the purchase price of a generic, refurbished or used item is often significantly lower than the purchase price of a branded and/or new item. Once the second subset of sellers is identified in block 714, the price comparison engine 700 computes the total purchase price for each combination of Group 2 sellers and items in a block 716 in a manner similar to that described above in connection with FIG. 6. Once the total purchase price has been computed for each combination of Group 2 sellers and items, those purchase price options are compared to the original purchase price, and for each combination that results in a total purchase price less than the original purchase price, the price comparison engine 700 computes the cost savings in a block 718.

Once the cost savings have been computed for each combination of Group 1 sellers and items and each combination of Group 2 sellers and items, the price comparison engine 700 determines in a decision block 720 if any combinations of sellers in Group 1 or Group 2 results in a total purchase price with cost savings greater than a minimum threshold, e.g., $5.00, 5%, etc. If no such combinations have been found, then the price comparison engine 700 ends in a block 724. However, if there exist purchase price options with cost savings greater than the predetermined threshold, those purchase price options are then displayed for the customer, e.g., in a Web page 400, in a block 722. The price comparison engine 700 then ends in a block 724.

It will be appreciated from the above descriptions of price engines 600 and 700 that computation time will often be a consideration during implementation. Due to the significant computation time required, it may not be desirable to generate each possible combination of sellers and items, even though such an implementation would be more likely to generate optimal purchase price options, i.e., purchase price options having the lowest possible price. Accordingly, in some embodiments of the present invention, a maximum time limit for generating the purchase price options is imposed. When the maximum time limit is reached, the price comparison engine may further consider and/or display only those purchase price options that it had time to generate. Although possibly sub-optimal, such purchase price options still may result in acceptable cost savings. Those skilled in the art will appreciate that the time limit may be of any duration deemed suitable and may be set by the customer or may be implemented as a system setting.

In yet other embodiments, the price comparison engine may be implemented only between the display of Web pages, e.g., while Web page 400 is being retrieved and displayed upon selecting the find it cheaper button 316 in Web page 300. Accordingly, only those purchase price options generated during this time period may be further considered and/or displayed by the price engine. Again, such purchase price options may be sub-optimal, but they may still result in acceptable cost savings while still maintaining the customer experience. Other limits unrelated to time may also be imposed on the price comparison engine. For example, generation of purchase price options may be terminated when a certain percentage or number of acceptable purchase price options (e.g., options resulting in sufficient cost savings) have been generated. For example, in one embodiment, the price comparison engine would cease generating further purchase price options as soon as three purchase price options resulting in cost savings greater than five percent are identified. In yet other embodiments, the price comparison engine may cease generating purchase price options based on a certain bias. For example, the price comparison engine may terminate as soon as a purchase price option of sufficient cost savings is generated that includes Store A as a seller.

In any of the above described embodiments in which processing is terminated prior to the generation of all combinations and purchase price options, the price comparison engine may prompt the customer for instructions to continue generating purchase price options should the customer so desire. Processing may thus be continued for an additional time period, for an additional absolute number or percentage of purchase price options, or until all possible purchase price options have been generated. The additional purchase price options may be displayed, e.g., on Web page 400, when computation is complete, or if the computation time is significant, the purchase price options may be delivered to the customer in a separate communication, e.g., via email, or posted on another Web page that later may be visited by the customer.

Figure 8:
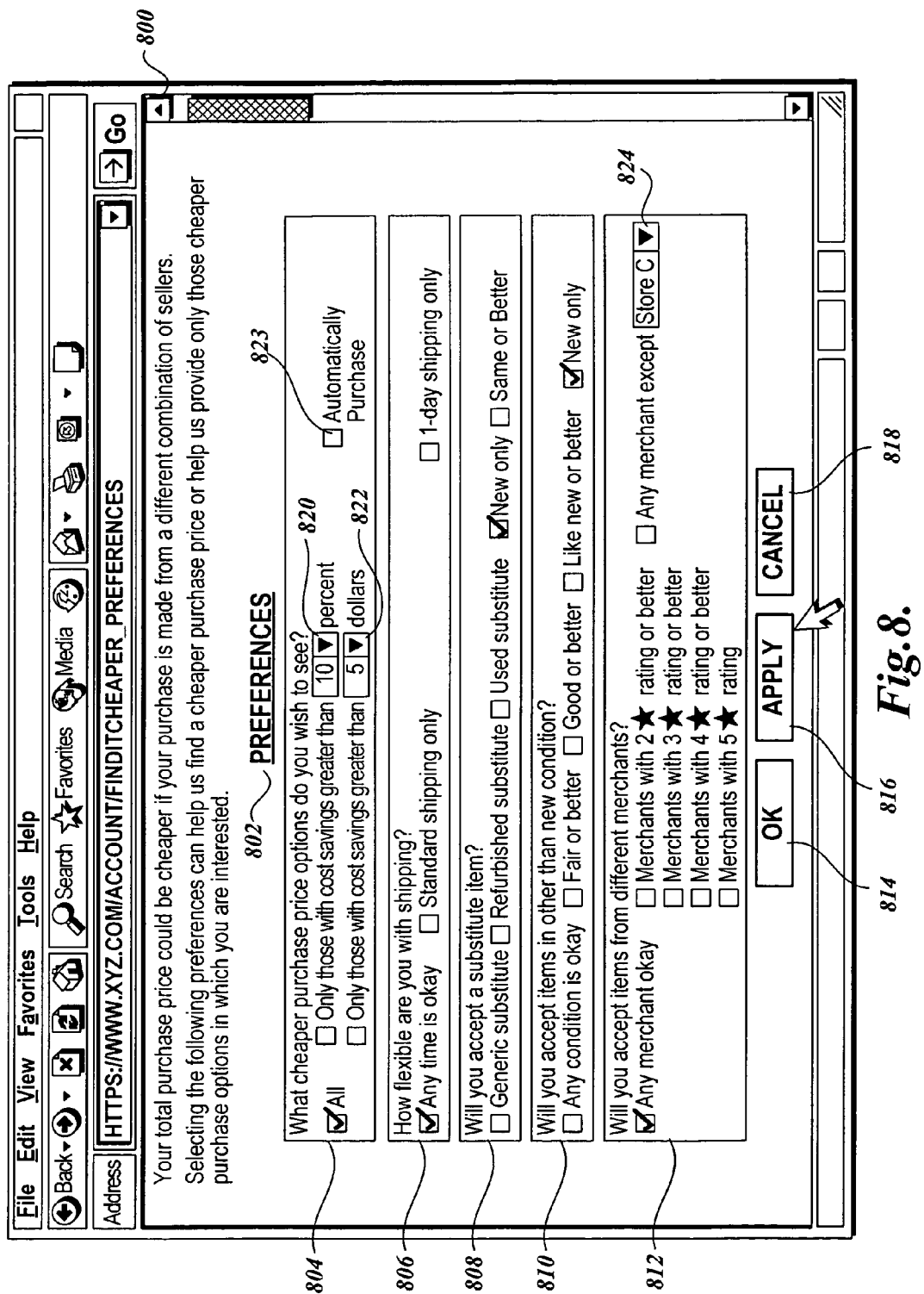
FIG. 8 depicts an exemplary Web page that prompts a customer for preferences that can be used to find less expensive purchase options.

As described above, preferences entered by a customer may be used as heuristics to reduce the number of combinations generated, limit the price variations upon which the total purchase price for each combination is computed, and/or filter or sort the purchase price options to be displayed. An exemplary Web page 800 that prompts a customer for such preferences is depicted in FIG. 8. In the exemplary preferences-page 800, the customer is prompted for the following preferences: (1) minimum threshold cost savings preferences in a box 804; (2) shipping preferences in a box 806; (3) substitute item preferences in a box 808; (4) item condition preferences in a box 810; and (5) seller or "merchant," preferences in a box 812. However, those skilled in the art will recognize that the customer may be prompted for fewer, more, or different preferences that may then be used as heuristics without departing from the spirit and scope of the present invention. In addition, it will be appreciated that the customer may be prompted for preferences in a variety of ways and at any time before, during or after the purchase process. Accordingly, preferences page 800 is used for illustrative purposes only and should not be construed as limiting.

Referring to the threshold cost savings box 804, the customer is prompted to enter what cheaper purchase price options he or she wishes to see. In the illustrated embodiment, the customer may choose to see all purchase price options generated by the price engine 600 or 700. Alternatively, the customer may elect to see only those purchase price options with cost savings greater than a certain percentage by selecting the appropriate check box and selecting the desired percentage from a drop-down menu 820. It will be appreciated that the percentage cost savings selected by the user may then be used as the cost savings threshold by the price comparison engine 600 in block 614, depicted in FIG. 6, or by the price comparison engine 700 in block 722 in FIG. 7. Rather than select a percentage cost savings, the customer may elect to see only those cost savings greater than an absolute dollar amount by selecting the appropriate check box and selecting a dollar amount from a drop-down menu 822. If a dollar amount threshold is chosen, it will be appreciated that the selected dollar amount may then be used as the minimum threshold by the price comparison engine 700. Accordingly, if either a percentage cost savings threshold or absolute dollar amount cost savings threshold is selected by the customer, the price comparison engine 700 will discard any purchase price combinations that have been generated below such a threshold and will display only those combinations with a percentage or absolute dollar cost savings greater than the customer-entered threshold. Additionally, the customer can select an automatic purchase feature, such as selection box 823.

Now referring to shipping preferences box 806, a customer may indicate his or her shipping preferences and such shipping preferences may be used by the price comparison engine 700 to further limit the number of combinations generated. In the illustrated example, the customer may indicate by selecting the appropriate check box that any type of shipping is acceptable, that only standard shipping is acceptable, that only two-day shipping is acceptable, or only one-day shipping is acceptable. If, for example, the customer indicates that only two-day shipping is acceptable, then that shipping preference is used as a heuristic by the price comparison engine 700 to identify those sellers capable of meeting the preferred shipping method. For example, in the price comparison engine 700 depicted in FIG. 7, shipping may be used as a heuristic in a block 708 or block 714 so that only those sellers offering overnight shipping are identified. Accordingly, the price comparison engine 700 computes the total cost of sale for each combination of sellers having two-day shipping in a block 710. In yet other embodiments, the shipping preference selected by the customer may be used in computing the total purchase price for each combination of sellers and items so that only the shipping costs corresponding to the shipping preference selected by the customer are considered by the price comparison engine.

Referring to the substitute item preference box 808, a customer may indicate that he or she is willing to accept substitute items (e.g., generic, refurbished, or used) for those items placed in his or her shopping cart. Since substitute items may be less expensive than new items, greater cost savings may be achieved. If a customer indicates that a generic, refurbished, or used substitute may be purchased in lieu of a new item, the user may select the corresponding check box in box 808. Additionally, the customer can associate a quality of substitute through check box 808. Although not illustrated in other embodiments, the customer may also identify particular brands that the customer would not accept as a substitute or equivalent product. Those brands would then be eliminated from consideration by the price comparison engine. The substitution preference may then be used as a heuristic (e.g., in either block 708 or 714 in price engine 700) to identify a first or second subset of sellers who sell generic, refurbished or used substitute items. Accordingly, the pool of sellers from which combinations may be generated is limited to only those sellers that offer substitute items.

Similarly, in a condition preference box 810, the customer may indicate if he or she will accept an item in something other than new condition (e.g., fair, good, or like new) by selecting the appropriate check box. Since items in poorer condition may be less expensive than new items, greater cost savings may be achieved. The condition preference may then be used as a heuristic by the price comparison engine 700 to limit the sellers considered to those that offer the items in a condition acceptable to the customer. Accordingly, those sellers offering items in less than a condition acceptable by the customer are eliminated from consideration by the price engine.

In the merchant preference box 812, a customer may indicate whether he or she is willing to purchase items from merchants or sellers different than those offering the items placed in the customer's shopping cart. Accordingly, a customer may indicate that any merchant is acceptable or that only those merchants with a minimum trust rating are acceptable. In the embodiment illustrated in FIG. 8, the customer may also indicate that any merchant is acceptable except for a particular merchant(s), as input by the customer using a drop-down menu 824. Accordingly, those merchants or sellers not acceptable to the customer are eliminated from consideration by the price comparison engine 700. Those skilled in the art will appreciate that the preferences depicted in FIG. 8 and described above are by no means exhaustive and, thus, should be considered for illustrative purposes only. In addition, those skilled in the art will recognize that any one or combination of the above preferences may be implemented as a system setting rather than a customer setting as described above. Moreover, any of the preferences noted above or other preferences may be used to filter or sort purchase price options rather than generate them. Finally, any of the preferences noted above or other preferences may be stored and accessed from memory 208 of order management server 200, or they may be stored in browser cookies on the customer's computer for future orders.

While embodiments of the invention have been illustrated and described, it will be appreciated that various changes can be made therein without departing from the spirit and scope of the invention.

The embodiments of the invention in which an exclusive property or privilege is claimed are defined as follows:

1. A computer-implemented method for finding a total purchase price for a group of items that is lower than an original total purchase price found for the group of items, the computer-implemented method comprising the steps of:
   generating, in a computer device, an offer for sale for the group of items at the original total purchase price from at least one seller;
   encoding for display in association with the offer for sale a component to be presented in a user interface that initiates an attempt to find the total purchase price for the group of items that is lower than the original total Purchase price, where the attempt to find the total purchase price for the group of items further comprises:
   identifying possible sellers of each item in the group from a database of sellers;
   for each combination of said possible sellers and items in the group,
      computing a total purchase price for the group of items;
      comparing said total purchase price to the original total purchase price for the group of items; and
      identifying the combination of possible sellers and items if said total purchase price is lower than the original total purchase price.

2. The computer-implemented method of claim 1 further comprising encoding for display the combination of possible sellers and items having a total purchase price lower than the original total purchase price.

3. The computer-implemented method of claim 2 further comprising encoding for display said total purchase price if a difference between said total purchase price and the original total purchase price is greater than a minimum threshold.

4. The computer-implemented method of claim 1 further comprising enabling purchase of the group of items at said total purchase price.

5. The computer-implemented method of claim 4 further comprising automatically enabling purchase of a selected group of items at said total purchase price.

6. The computer-implemented method of claim 1, wherein identifying possible sellers of each item in the group comprises applying a heuristic to limit the number of possible sellers identified.

7. The computer-implemented method of claim 6, wherein the heuristic is based on at least one of a price promotion, a shipping promotion, a seller trust rating, availability of equivalent items and condition of the terms.

8. The computer-implemented method of claim 1, wherein the total purchase price for the group of items is computed as a function of an aggregate price for the group of items and at least one other price variation.

9. The computer-implemented method of claim 8, wherein computing the total purchase price for the group of items comprises applying a heuristic to limit a number of price variations used to calculate the total purchase price.

10. The computer-implemented method of claim 9, wherein the heuristic is based on at least one of a price promotion, a shipping promotion, a seller trust rating, availability of equivalent items and condition of the items.

11. A computer-implemented method for finding purchase price options for a group of items that are lower than an initial purchase price found by a customer for the group of items, wherein the group of items is selected for possible purchase from a first combination of sellers belonging to an electronic marketplace, the computer-implemented method comprising the steps of:
   generating, in a computer device, an offer for sale for the group of items at the initial Purchase price from the first combination of sellers belonging to the electronic marketplace;
   encoding for display in association with the offer for sale a component to be presented in a user interface that initiates an attempt to find the purchase price options for the group of items that are lower than the initial Purchase price, where the attempt to find the purchase price options for the group of items further comprises:
   determining, in the computer device, at least one purchase price option for the group of items from a second combination of sellers belonging to the electronic marketplace, wherein said second combination of sellers and items is different than the first combination of sellers and items;
   encoding, in the computer device, for display said at least one purchase price option if said purchase price option results in a cost savings as compared to the initial purchase price; and
   enabling a customer to order the group of items from the second combination of sellers from which said at least one purchase price option is determined.

12. The computer-implemented method of claim 11 further comprising receiving a customer request to determine said at least one purchase price option for the group of items.

13. The computer-implemented method of claim 11, wherein the at least one purchase price option is encoded for display if said purchase price option results in a cost savings that is greater than a minimum threshold.

14. The computer-implemented method of claim 13, wherein the cost savings is a minimum percentage threshold.

15. The computer-implemented method of claim 13, wherein the cost savings is a minimum absolute dollar threshold.

16. The computer-implemented method of claim 11, wherein determining at least one purchase price option for the group of items comprises:
   identifying possible sellers of each item in the group;
   for each second combination of said possible sellers and items in the group,
      computing a purchase price for the group of items;
      comparing said purchase price to the initial purchase price for the group of items; and
      if said purchase price is lower than the initial purchase price, identifying the second combination of sellers and the computed purchase price as a purchase price option.

17. The computer-implemented method of claim 16, wherein identifying possible sellers of each item in the group comprises applying a heuristic to limit the number of possible sellers identified.

18. The computer-implemented method of claim 17, wherein the heuristic is based on at least one of a price promotion, a shipping promotion, a seller trust rating, availability of equivalent items and condition of the items.

19. The computer-implemented method of claim 18, wherein the purchase price for the group of items is computed as a function of an aggregate price for the group of items and at least one other price variation.

20. The computer-implemented method of claim 19, wherein computing the total purchase price for the group of items comprises applying a heuristic to limit a number of price variations used to calculate the total purchase price.

21. The computer-implemented method of claim 20, wherein the heuristic is based on at least one of a price promotion, a shipping promotion, a seller trust rating, availability of equivalent items and condition of the items.

22. The computer-implemented method of claim 11 further comprising encoding for display said cost savings with said at least one purchase option.

23. The computer-implemented method of claim 11, wherein a plurality of purchase price options for the group of items is determined and encoded for display.

24. The computer-implemented method of claim 23 further comprising applying a heuristic to the plurality of purchase price options to determine which purchase price options to encode for display.

25. The computer-implemented method of claim 24, wherein the heuristic is based on at least one of a price promotion, a shipping promotion, a seller trust rating, availability of equivalent items and condition of the items.

26. The computer-implemented method of claim 11 further comprising encoding for display a breakdown of said at least one purchase price option.

27. A system for identifying options for purchasing selected items at less than an initial purchase price found for said items from an initial combination of sellers, the system comprising:
a database for storing information related to items available for purchase from a plurality of sellers; and
a computing device in communication with said database that is operative to:
determine the initial purchase price for the items selected from said initial combination of sellers using the information related to said items and sellers that is stored in the database;
encode for display a user interface that includes an offer for sale for the items at the initial purchase price from the initial combination of sellers;
include a graphical component in the user interface that initiates an attempt to find a plurality of options for purchasing the items from combinations of sellers other than said initial combination of sellers;
generate options for purchasing the items from combinations of sellers other than said initial combination of sellers using the information related to said items and sellers that is stored in the database; and
identify at least one of said options for purchasing the items that result in a cost savings as compared to the initial purchase price.

28. The system of claim 27, wherein options for purchasing the items are generated until a maximum time limit is reached.

29. The system of claim 27, wherein options for purchasing the items are generated until a bias has been satisfied.

30. The system of claim 27, wherein options for purchasing the items are generated while a response is generated to a request for a Web page.

31. The system of claim 27, wherein options for purchasing the items are generated until at least one of a maximum number and a maximum percentage of options is reached.

32. The system of claim 27, wherein the options for purchasing the items are generated by:
identifying possible sellers of each selected item using the information related to said items and sellers that is stored in the database;
for each combination of said possible sellers and selected items,
computing a purchase price for the selected items;
comparing said purchase price to an initial purchase price for the selected items; and
if said purchase price is lower than the initial purchase price, identifying the combination of sellers and the computed total purchase price as an option for purchasing the items.

33. The system of claim 32, wherein identifying possible sellers of each selected item comprises applying a heuristic to limit the number of possible sellers identified.

34. The system of claim 33, wherein the heuristic is based on at least one of a price promotion, a shipping promotion, a seller trust rating, availability of equivalent items and condition of the items.

35. The system of claim 32, wherein the purchase price for the selected items is computed as a function of an aggregate price for the selected items and at least one other price variation.

36. The system of claim 35, wherein computing the total purchase price for the selected items comprises applying a heuristic to limit a number of price variations used to calculate the total purchase price.

37. The system of claim 27, wherein the server is further operative to generate instructions for display of said at least one option for purchasing the items.

38. The system of claim 37, wherein the server is further operative to automatically select an option for purchase.

39. The system of claim 27, wherein the server is further operative to generate instructions for display of a breakdown of said at least one option for purchasing the items.

40. A computer-accessible storage medium having instructions encoded thereon that finds a lower total purchase price for items selected for possible purchase from sellers belonging to an electronic marketplace, and wherein the instructions, when executed by a computing apparatus, cause the computing apparatus to:
determine a total purchase price for items selected for possible purchase from a first combination of sellers;
identify the at least one alternative for purchasing the same items at a lower total purchase price from a combination of sellers other than said first combination of sellers; and
retain said at least one alternative for purchasing the same items at the lower total purchase price.

41. The computer-accessible storage medium of claim 40 further including instructions encoded thereon that cause the computing apparatus to provide an option to request identifying at least one alternative for purchasing the same items at a lower price.

42. The computer-accessible storage medium of claim 41, wherein said option is provided only if at least one alternative for purchasing the same items at a lower price exists.

43. The computer-accessible storage medium of claim 40, wherein the instructions cause the computer apparatus to determine at least one alternative for purchasing the same items at a lower price by:
   identifying a first group of possible sellers of each selected item;
   for each combination of said possible sellers in said first group and selected items,
      computing an alternative purchase price for the selected items;
      comparing said alternative purchase price to the total purchase price for selected items; and
      if said alternative purchase price is lower than the total purchase price, identifying the combination of sellers in said first group and the computed alternative purchase price as an alternative for purchasing the same items at a lower price.

44. The computer-accessible storage medium of claim 43, wherein the instructions cause the computer apparatus to identify the first group of possible sellers of each selected item by applying a heuristic to limit the number of possible sellers identified.

45. The computer-accessible storage medium of claim 44, wherein the heuristic is based on at least one of a price promotion, a shipping promotion, a seller trust rating, availability of equivalent items and condition of the items.

46. The computer-accessible storage medium of claim 43, wherein the instructions cause the computer apparatus to compute the alternative purchase price for the selected items as a function of an aggregate price for the selected items and at least one other price variation.

47. The computer-accessible storage medium of claim 46, wherein the instructions cause the computer apparatus to compute the alternative purchase price for the selected items by applying a heuristic to limit the price variations of which the alternative purchase price is computed as a function.

48. The computer-accessible storage medium of claim 47, wherein the heuristic is based on at least one of a price promotion, a shipping promotion, a seller trust rating, availability of equivalent items and condition of the items.

49. The computer-accessible storage medium of claim 43 further including instructions encoded thereon that cause the computer apparatus to determine at least one additional alternative for purchasing the same items at a lower price by:
   identifying a second group of possible sellers of each selected item;
   for each combination of said possible sellers in said group,
      computing an alternative purchase price for the selected items;
      comparing said alternative purchase price to the total purchase price for the selected items; and
      if said alternative purchase price is lower than the total purchase price, identifying the combination of sellers in said second group and the computed total purchase price as an additional alternative for purchasing the same items at a lower price.

50. The computer-accessible storage medium of claim 49 further including instructions encoded thereon that cause the computer apparatus to retain the alternatives for purchasing the same items at a lower price from the first group of sellers and the second group of sellers that result in acceptable cost savings.

51. The computer-accessible storage medium of claim 49, wherein instructions cause the computer apparatus to identify a second group of possible sellers of each selected item by applying a heuristic to limit the number of possible sellers identified.

52. The computer-accessible storage medium of claim 51, wherein the heuristic is based on at least one of a price promotion, a shipping promotion, a seller trust rating, availability of equivalent items and condition of the items.

53. The computer-accessible storage medium of claim 49, wherein the instructions cause the computer apparatus to compute the alternative purchase price for the selected items as a function of an aggregate price for the selected items and at least one other price variation.

54. The computer-accessible storage medium of claim 53, wherein the instructions cause the computer apparatus to compute the total purchase price for the group of items by applying a heuristic to limit the price variations of which the total purchase price is computed as a function.

55. The computer-accessible storage medium of claim 54, wherein the heuristic is based on at least one of a price promotion, a shipping promotion, a seller trust rating, availability of equivalent items and condition of the items.

56. The computer-accessible storage medium of claim 40 further including instructions encoded thereon that cause the computer apparatus to identify a plurality of alternatives for purchasing the same items at a lower purchase price.

57. The computer-accessible storage medium of claim 56, wherein the instructions cause the computer apparatus to apply a heuristic to determine which purchase price options to display.

58. The computer-accessible storage medium of claim 57, wherein the heuristic is based on at least one of a price promotion, a shipping promotion, a seller trust rating, availability of equivalent items and condition of the items.

59. A computer-implemented method for selecting a group of items, the computer-implemented method comprising:
   encoding in a computing device, for display a user interface that includes an offer for sale for a group of items from at least one seller;
   including a graphical component in the user interface that initiates an attempt to identify a plurality of possible sellers of each item in the group from a database of sellers;
   identifying the possible sellers of each item in the group from the database of sellers upon obtaining an indication that the graphical component was manipulated;
   for each combination of said possible sellers and items in the group,
      associating at least one characteristic to the combination of possible sellers and items in the group;
      comparing said characteristic to a characteristic for an original combination of possible sellers and items in the group; and
      identifying the combination of possible sellers and items based upon a comparison of said characteristic of the combination of possible sellers and items in the group and the characteristic of the original combination of possible sellers and items in the group.

60. The computer-implemented method of claim 59 further comprising encoding for display the identified combination of possible sellers and items in the group.

61. The computer-implemented method of claim 60 further comprising encoding for display the identified combination of possible sellers and items if the difference between the characteristic of the combination of possible sellers and items in the group and the characteristic of the original combination of possible sellers and items in the group is above a threshold.

62. The computer-implemented method of claim 61 further comprising enabling purchase of a selected combination of possible sellers and items in the group.

63. The computer-implemented method of claim 62 further comprising automatically enabling purchase of a selected combination of possible sellers and items in the group.

64. The computer-implemented method of claim 59, wherein the characteristic associated with the combination of possible sellers and items in the group is selected from a group consisting of shipping time, seller trust, condition of item, seller ratings and preferred sellers.

* * * * *